US011681160B2

(12) United States Patent
Hekmat et al.

(10) Patent No.: US 11,681,160 B2
(45) Date of Patent: Jun. 20, 2023

(54) CONTACT LENS BATTERY MANAGEMENT

(71) Applicant: Tectus Corporation, Saratoga, CA (US)

(72) Inventors: Mohammad Hekmat, Saratoga, CA (US); Ashkan Olyaei, Saratoga, CA (US); Michael W Wiemer, Saratoga, CA (US)

(73) Assignee: Tectus Corporation, Saratoga, CA (US)

( * ) Notice: Subject to any disclaimer, the term of this patent is extended or adjusted under 35 U.S.C. 154(b) by 307 days.

(21) Appl. No.: 17/003,048

(22) Filed: Aug. 26, 2020

(65) Prior Publication Data

US 2021/0096398 A1 Apr. 1, 2021

Related U.S. Application Data

(60) Provisional application No. 62/906,568, filed on Sep. 26, 2019.

(51) Int. Cl.
| | |
|---|---|
| *H02J 7/00* | (2006.01) |
| *G02C 7/04* | (2006.01) |
| *H01M 6/02* | (2006.01) |
| *H01M 50/247* | (2021.01) |
| *H01M 10/44* | (2006.01) |
| *H01M 10/42* | (2006.01) |
| *G02C 11/00* | (2006.01) |

(52) U.S. Cl.
CPC ............ *G02C 7/049* (2013.01); *G02C 7/04* (2013.01); *G02C 11/10* (2013.01); *H01M 6/02* (2013.01); *H01M 10/425* (2013.01); *H01M 10/441* (2013.01); *H01M 50/247* (2021.01); *H01M 2010/4271* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 6,051,955 A | 4/2000 | Saeki | |
| 8,933,702 B2 | 1/2015 | Deveau | |
| 9,077,000 B2 | 7/2015 | Liang | |
| 10,008,739 B2 | 6/2018 | Liang | |
| 10,644,531 B1* | 5/2020 | Qiu | ............... H02M 7/25 |
| 2012/0032513 A1 | 2/2012 | Tsu | |
| 2012/0176098 A1 | 7/2012 | Greening | |
| 2013/0113495 A1* | 5/2013 | Kim | ............... H01M 10/425 |
| | | | 324/434 |
| 2016/0064969 A1 | 3/2016 | Pernyeszi | |
| 2018/0131197 A1 | 5/2018 | Mcewan | |
| 2018/0226680 A1 | 8/2018 | Wright | |

OTHER PUBLICATIONS

M. Nasreldin et al., "Flexible Micro-Battery for Powering Smart Contact Lens", Sensors 2019, 19, 2062; doi:10.3390/s19092062, 7 pages.

* cited by examiner

*Primary Examiner* — Arun C Williams
(74) *Attorney, Agent, or Firm* — North Weber & Baugh LLP; Michael North

(57) ABSTRACT

A contact lens battery management system (BMS) monitors battery health in an electronic contact lens. A battery made with high-internal-resistance cells is coupled on a cell-by-cell basis to input switches of a power management integrated circuit (PMIC) that monitors, detects, and isolates faulty circuit components.

19 Claims, 12 Drawing Sheets

CONTACT LENS BATTERY MANAGEMENT

CROSS-REFERENCE TO RELATED APPLICATION

This patent application claims priority benefit, under 35 USC § 119(e), to U.S. Provisional Pat. App. No. 62/906,568, filed on Sep. 26, 2019, entitled "Contact Lens Battery Management," and listing Mohammad Hekmat and Michael W. Wiemer as inventors. Each document mentioned in this patent document is herein incorporated by reference in its entirety and for all purposes.

BACKGROUND

Electronic contact lenses are an emerging technology that promises to revolutionize how we interact with information and communicate with one another. An electronic contact lens may include a femtoprojector that projects video images onto the retina of a person wearing the lens, thereby providing an augmented reality experience without goggles.

An electronic contact lens may also include a femtoimager, inertial motion sensors, magnetometers, radio transmitters and receivers, and other electronic components. Each of these uses electrical power which may be provided by a battery in the lens. What is needed is a system to automatically monitor and charge the battery, manage the power requirements of circuits in the lens, and mitigate component or battery faults.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION

Figure 1:
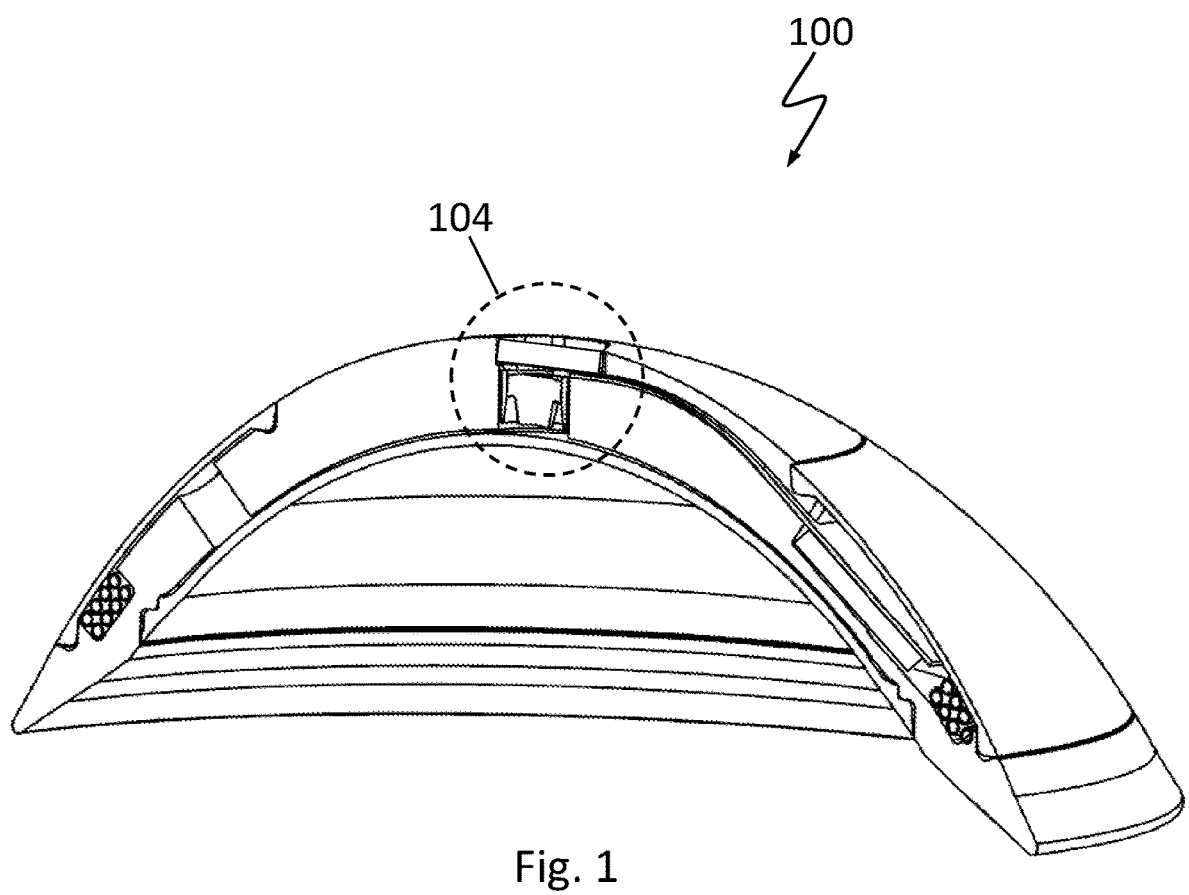
FIG. 1 is a general illustration of an exemplary electronic contact lens.

A battery in an electronic contact lens comprises a set of individual cells. A battery management system (BMS) monitors the cells on a cell-by-cell basis. This is in contrast to conventional battery management in which a power management integrated circuit (PMIC) is connected to one or more batteries and does not manage individual battery cells. In a contact lens battery management system the PMIC has a separate pin for each cell in a battery. This enables the PMIC to monitor, control and isolate the cells separately from one another.

Battery monitoring is accomplished by measuring parameters such as cell voltage, charging and discharging current, and cell temperature, to ensure proper operation within recommended ranges. The BMS may detect events such as loss of capacity, hysteresis in a charge cycle, and other events that degrade battery life. In addition, monitoring helps prevent system failures such as overheating, accidental damage, over/undercharge conditions, etc., and enhances battery performance and utilization of battery capacity.

Battery manufacturers minimize internal battery resistance in order to ensure high overall efficiency and power delivery capability. Keeping the internal battery resistance as low as possible also permits higher charging currents. Chemical engineering of batteries is a complicated subject; however, the desire to minimize internal resistance is common. A discussion of battery production processes in U.S. Pat. No. 9,077,000 is typical: "The thin oxide layer, which is formed at the interface of the cathode 42 and the cathode current collector 38, undesirably increases the internal resistance of the battery cell 42" (emphasis added).

On the other hand, low internal battery resistance leads to high current and high power dissipation in the event of a battery internal short circuit. Such a failure in a low-internal-resistance cell could generate an unacceptable amount of heat in a volume as small as that of a contact lens, and drain energy stored in other cells.

Some approaches to reduce undesirable thermal stress and thermal runaway involve using a BMS to open switches coupled to affected circuit components in the event a runaway condition is detected. However, since there are no known methods for preventing an internal battery failure, existing approaches cannot eliminate excessive heat generation due to an internal battery short circuit that is independent of load conditions and is exacerbated by the battery's low internal resistance. Therefore, known approaches are not suitable for heat sensitive applications such as electronic contact lenses.

Described herein are battery-operated systems and methods that automatically monitor battery health and limit power dissipation to acceptable levels if events such as unexpected short circuits are encountered internal or external to the battery.

The figures and description relate to various embodiments by way of illustration. Alternative embodiments of the structures and methods disclosed herein will be readily recognized by one of skill in the art.

FIG. 1 is a general illustration of an exemplary electronic contact lens. Electronic contact lens 100 may be an augmented reality device. It may allow a user to see virtual objects superimposed on the real environment. Electronic contact lens 100 may be implemented as a scleral contact lens designed to be fixed on the wearer's eyeball. Embedded on contact lens 100 may be femtoprojector 104, sensors (106 shown in FIG. 2), and power, communications, and control systems. A femtoprojector is a miniature video projector that projects images on the wearer's retina. Sensors 106 may comprise motion sensors, such as accelerometers, magnetometers and gyroscopes, and image sensors.

Power, communications, and control systems may comprise power coils that enable power transfer, or an energy storage device, such as a battery, that can deliver sufficient energy to operate electronic contact lens 100 for a period of time. Electronic contact lenses may also include radio transceivers for communication with internal and/or external devices, and various controllers that control circuits and sub-circuits.

The user of an electronic contact lens 100 may use a combination of eye movements and other signals to interact with a virtual scene within a virtual environment. This interaction may be supplemented with various auxiliary devices such a head-mounted device, a smartphone, a hand-held controller, other body sensor, electronic jewelry or any other type of device that can communicate with the electronic contact lens.

Certain tasks performed by electronic contact lens 100 may equally be performed, for example, by an auxiliary device or charger (not shown in FIG. 1) that may be communicatively coupled with electronic contact lens 100. Some examples of auxiliary devices, femtoprojectors, and their functions and components are described in greater detail in U.S. patent application Ser. No. 15/959,169, filed on Apr. 21, 2018, entitled "Power Generation Necklaces that Mitigate Energy Absorption in the Human Body," listing inventors Miller et al.; U.S. patent application Ser. No. 15/966,481, filed on Apr. 30, 2018, entitled "Multi-Coil Field Generation In An Electronic Contact Lens System," listing inventors Owens et al.; U.S. patent application Ser. No. 15/966,475, filed on Apr. 30, 2018, entitled "Multi-Coil Field Generation In An Electronic Contact Lens System," listing inventors Owens et al.; U.S. patent application Ser. No. 15/984,182, filed on May 18, 2018, entitled "Power Generation Necklaces that Reduce Energy Absorption in the Human Body," listing inventors Owens et al.; U.S. patent application Ser. No. 16/035,640, filed on Jul. 15, 2018, entitled "Eye-mounted Displays Including Embedded Conductive Coils," listing inventors Mirjalili et al.; and U.S. patent application Ser. No. 16/227,139, filed on Dec. 20, 2018, entitled "Eye-Mounted Display System Including A Head Wearable Object," listing inventors Pang et al., which patent documents are incorporated by reference herein in their entirety and for all purposes.

In embodiments, an auxiliary device may comprise circuitry to communicate via an electronic communication protocol (e.g., an encryption protocol that facilities the exchange of credentials during an authorization process) with contact lens 100 and directly or indirectly (e.g., via the user's phone) with an external network (e.g., Internet). The auxiliary device may perform various computationally intensive tasks in lieu of electronic contact lens 100, such as computing some or all of the display data for femtoprojectors 104. In addition, the accessory device may serve as an intermediate data storage tool that increases the storage capacity of electronic contact lens 100.

In embodiments, electronic contact lens 100 and/or the auxiliary device manages how, where, and when a virtual object in a virtual scene is displayed within a given coordinate space. The electronic contact lens and/or auxiliary device may update the content and layout of a virtual scene including the graphical representation of objects on the display according to user's eye-movement, which may be tracked, estimated (e.g., using a Kalman filter) and/or predicted based on motion, image, sensor data or a combination thereof.

Suitable sensors may be used to sense eye movements to determine distance, speed, acceleration, orientation, path, angle, rate, etc. Examples of various types of sensors and their strategic locations on contact lens 100 are described in more detail in U.S. patent application Ser. No. 16/005,379, filed on Jun. 11, 2018, entitled "Contact lens gaze tracking architectures," listing inventors Mirjalili et al. and U.S. patent application Ser. No. 16/200,039, filed on Nov. 26, 2018, entitled "Eye-mounted Displays Including Embedded Solenoids," listing inventors Mirjalili et al., which patent documents are incorporated by reference herein in their entirety and for all purposes.

Figure 2:
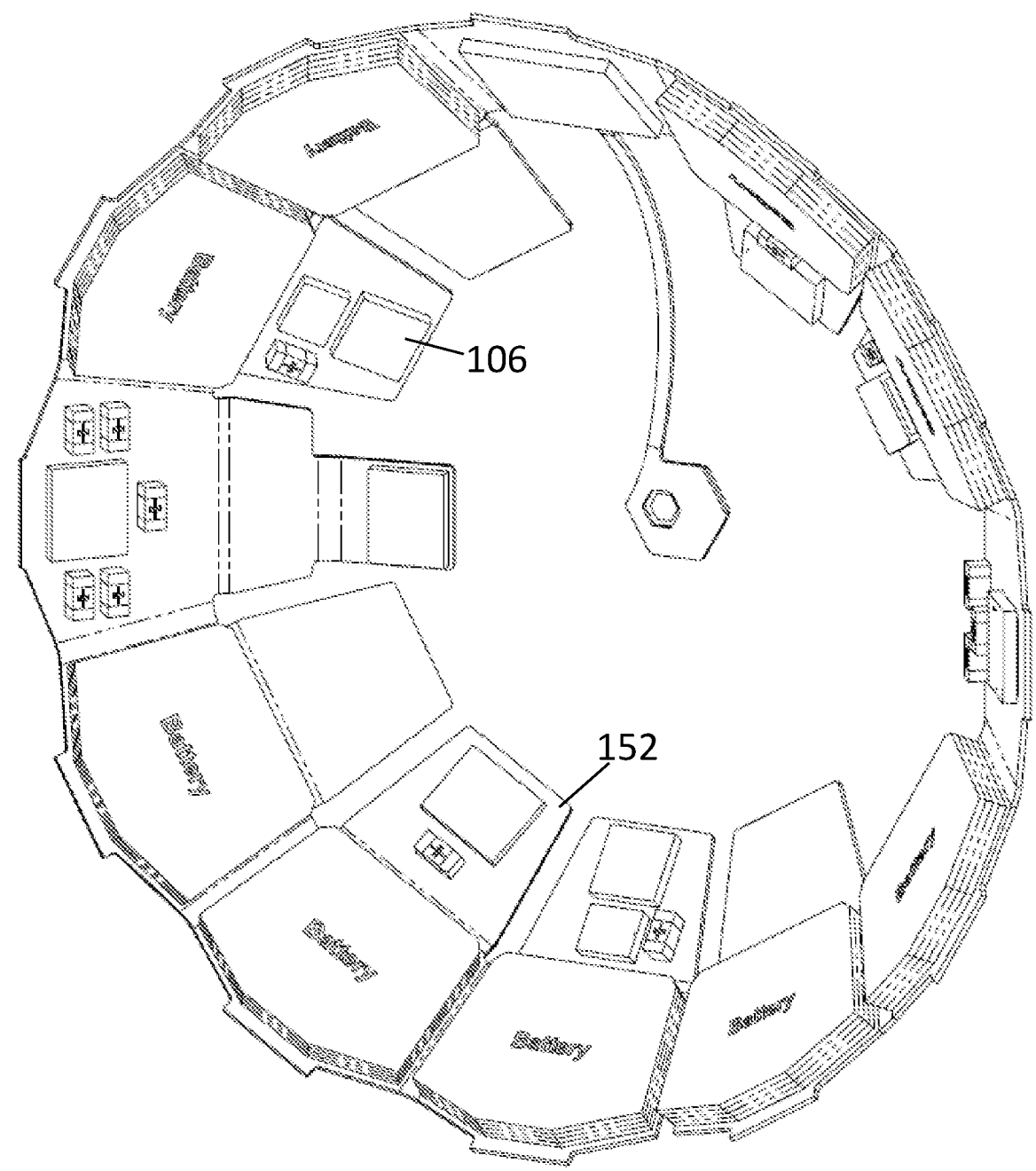
FIG. 2 illustrates an exemplary implementation of batteries for use in an electronic contact lens.

FIG. 2 illustrates optical and electrical circuit components mounted on a flexible circuit board for use in an electronic contact lens. Various optical and electrical circuit components may comprise power, communications, and control systems. Sub-components or parts of components may be distributed on different sections 152. As an example, as shown in FIG. 2, individual batteries or components of one or more batteries may be placed on different sections 152.

Figure 3:
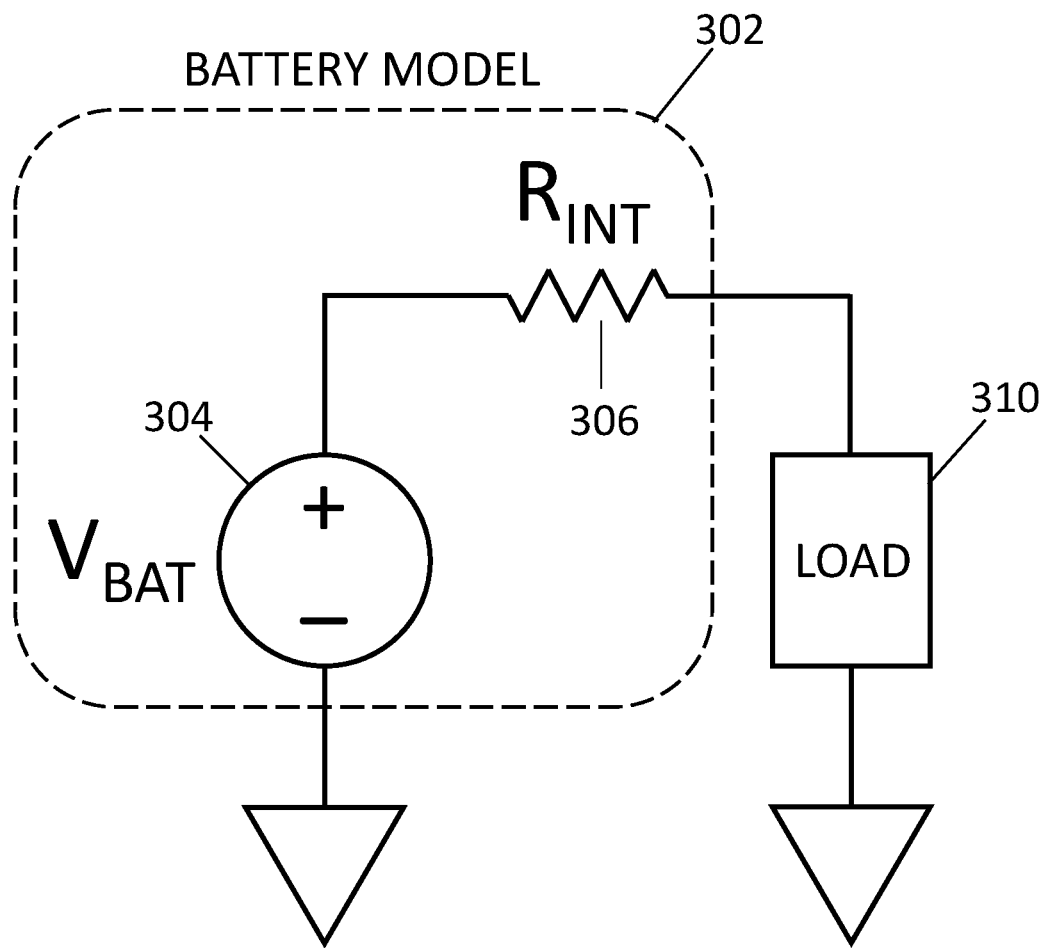
FIG. 3 illustrates a general battery model.

FIG. 3 illustrates a general battery model 302 which represents a battery as a voltage source 304 and an internal battery resistance $R_{INT}$ 306. A battery may contain several cells connected in series or parallel, or combinations of both. Therefore $V_{BAT}$ and $R_{INT}$ depend on combinations of cell voltages and resistances. A battery may be coupled to a load, such as load 310.

Consider an example in which $V_{BAT}$=4 Volts, and the load represents a low resistance short circuit condition. To limit the maximum dissipated power to 5 mW, an $R_{INT}$ 306 of about 3200 Ohms is required. While this reduces the amount of heat generated in load 310, the voltage drop across $R_{INT}$ 306 inside battery 302 limits the power available for load 310. In addition, a high $R_{INT}$ 306 wastes power and lowers efficiency.

The voltage drop across $R_{INT}$ 306 limits the voltage that drives load 310 at the output of battery 302. Other drawbacks of a large $R_{INT}$ 306 include: an increased charging time when using voltage-based charging, added complexity when using constant-current charging due to the extra voltage drop across $R_{INT}$ 306, and lower battery manufacturing yields.

In an electronic contact lens, multi-cell battery systems increase overall battery capacity and runtime. Furthermore, batteries having n cells compensate for undesirable effects of high $R_{INT}$. This may be accomplished by connecting cells to a PMIC, each by their own connection. For example, if there are three cells, then each of the three cells is connected to its own pin on the PMIC. Switches inside the PMIC allow it to connect the cells in parallel or to isolate one or more cells and disconnect it from the other cells.

This design limits heat generation in the event of a cell fault, while allowing the $R_{INT}$ of the battery to be n times smaller than that of individual battery cells. In addition, faulty cell(s) may be isolated from the rest of the circuit, as discussed next.

Figure 4:
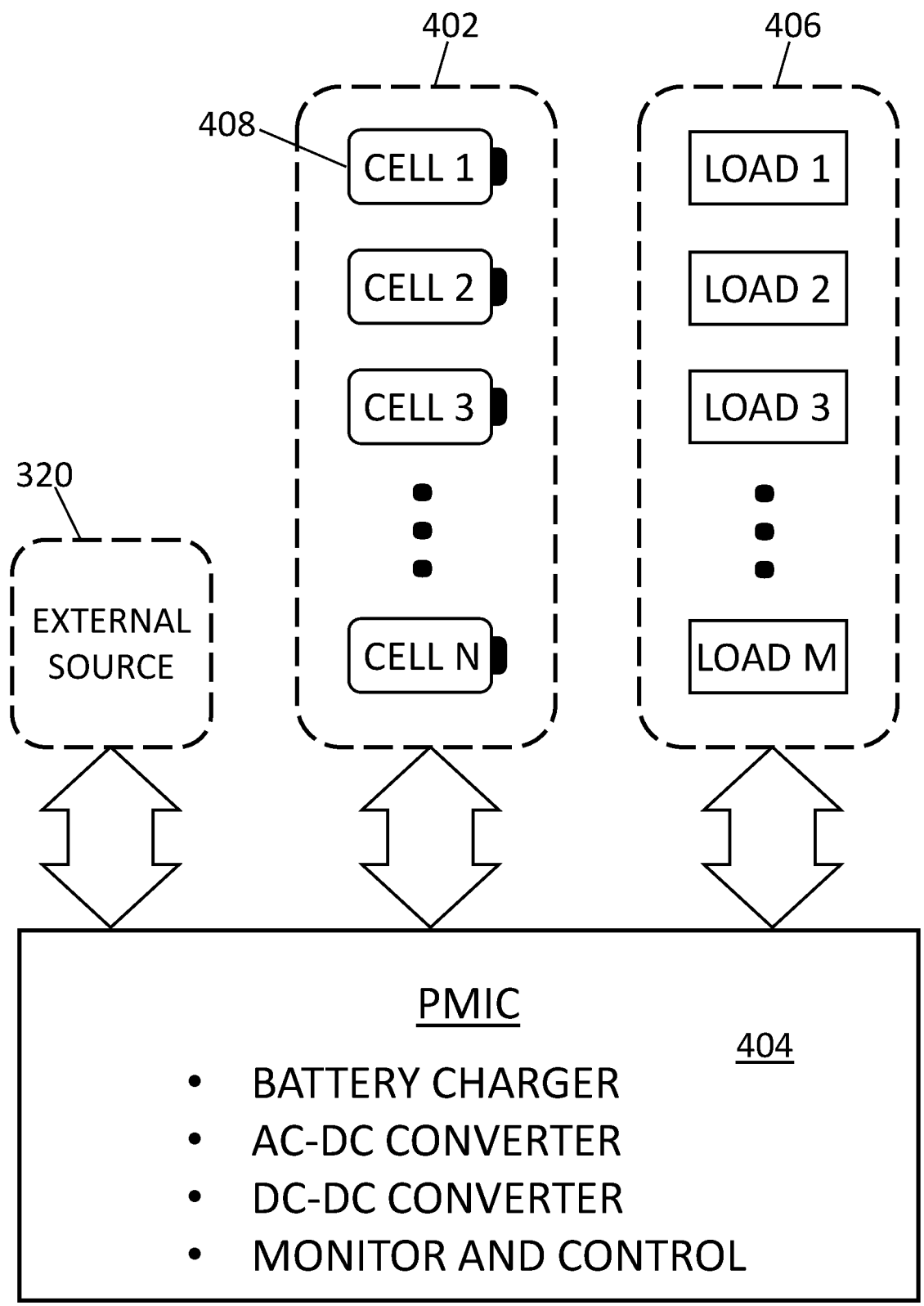
FIG. 4 is a general illustration of an exemplary battery management system (BMS) for an electronic contact lens. The BMS includes a power management integrated circuit (PMIC).

FIG. 4 is a general illustration of an exemplary battery management system (BMS) for an electronic contact lens. In FIG. 4 battery 402 is connected to power management integrated circuit (PMIC) 404. Battery 402 comprises several (e.g. n) individual cells. (Normally n≥2.) Load 406 and an external source 320 are also connected to the PMIC. Load 406 may comprise several (e.g. m) separate loads such as femtoprojectors, femtoimagers, motion sensors, etc. PMIC 404 may include circuits for battery charging, AC-DC conversion, DC-DC conversion, and monitoring and control.

As depicted in FIG. 4, battery 402 comprises a number of (i.e. n) individual cells 408 that may be implemented as electrochemical cells, such as lithium-ion cells. As will be discussed with reference to FIG. 5, each cell (e.g. 408) may be coupled to its own connection pin on PMIC 404. A parallel circuit in which the total resistance of battery 402 is lower than the internal resistance of any individual cell 408 may be created when switches in the PMIC are closed. In this case, the output current is n times the current generated by a single cell 408. When PMIC 404 configures n cells in parallel, the overall internal resistance of battery 402 is divided by n when compared to the internal resistance $R_{INT}$ of a single cell.

Any individual cell, e.g. 408, comprises relatively high $R_{INT}$ that limits power dissipation in the event the cell experiences an internal short circuit. Even when the cell is shorted the steady-state current through the internal resistance is low enough that the resulting heat is limited.

A high internal resistance battery may be created by means known in the art, such as adjusting cell chemistry, thickness or processing conditions. Controlling the ambient gas mixture in an annealing step or the partial pressure of a gas in a sputtering step are examples of process adjustments that have been reported (see, e.g., U.S. Pat. No. 10,008,739) to affect the internal resistance of thin-film lithium phosphorus oxynitride batteries. Other process variations may be appropriate for batteries made from ionic liquid gel electrolyte sandwiched between a zinc electrode and a metal oxide electrode (see, e.g., US Patent Application 2018/0226680).

"High" internal battery resistance means higher than a fraction of the equivalent resistance of the expected load. For example, a high internal battery resistance may be $R_{INT} > 0.1(R_L)$. Internal battery resistance greater than ten percent of the load resistance, $R_L$, is much greater than what is encountered in conventional designs. Usually internal battery resistance is less than ten Ohms. A high internal battery resistance may be hundreds of Ohms, for example more than 200 Ohms. The equivalent resistance of a load is the voltage applied to the load divided by the current flow through the load.

In the event of a failure, PMIC 404 detects the failure, or indicia thereof, and decouples itself from cell 408 and/or load 406, as discussed next.

Figure 5:
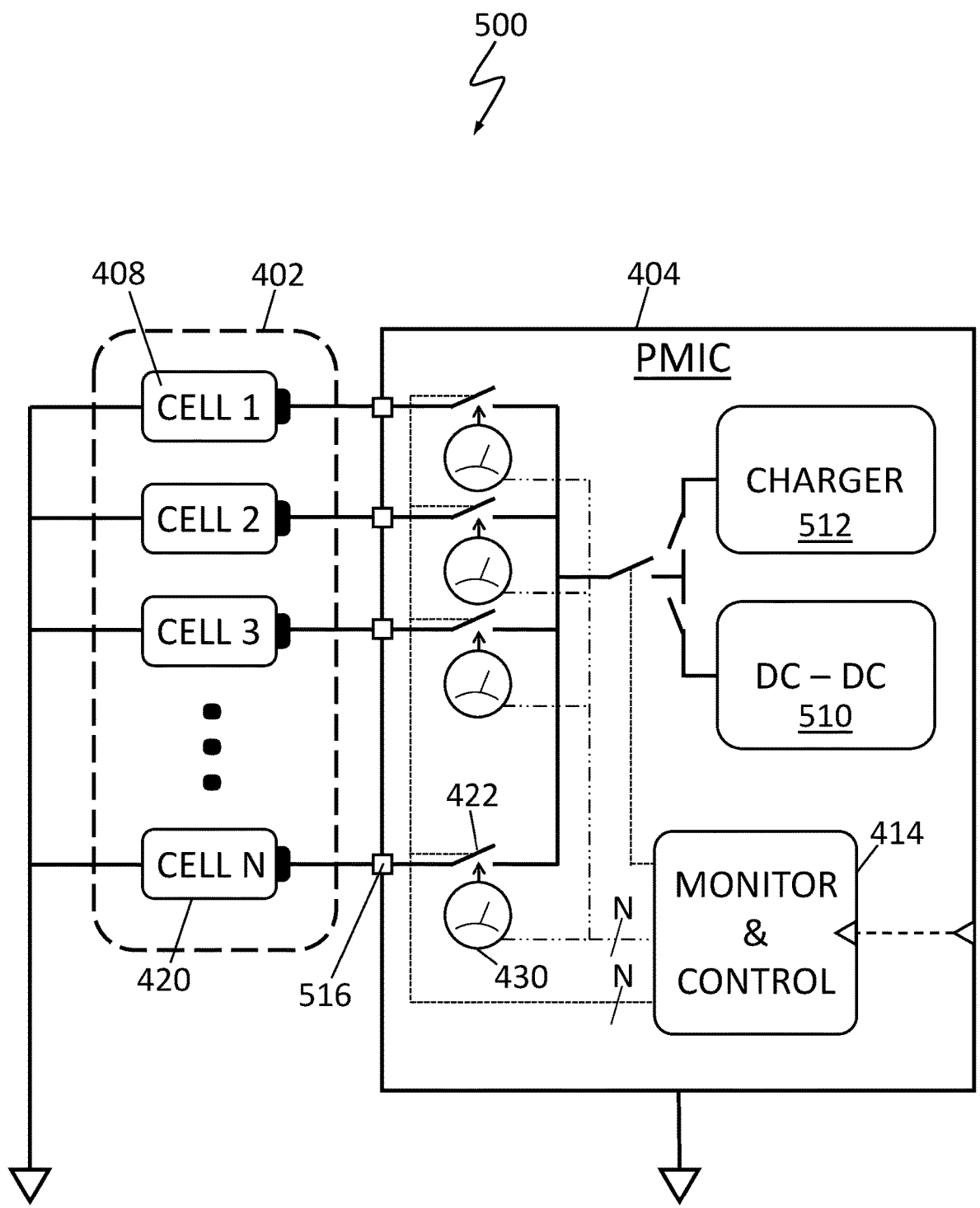
FIG. 5 illustrates details of the connection between the PMIC and the cells of a battery in a contact lens.
Figure 6:
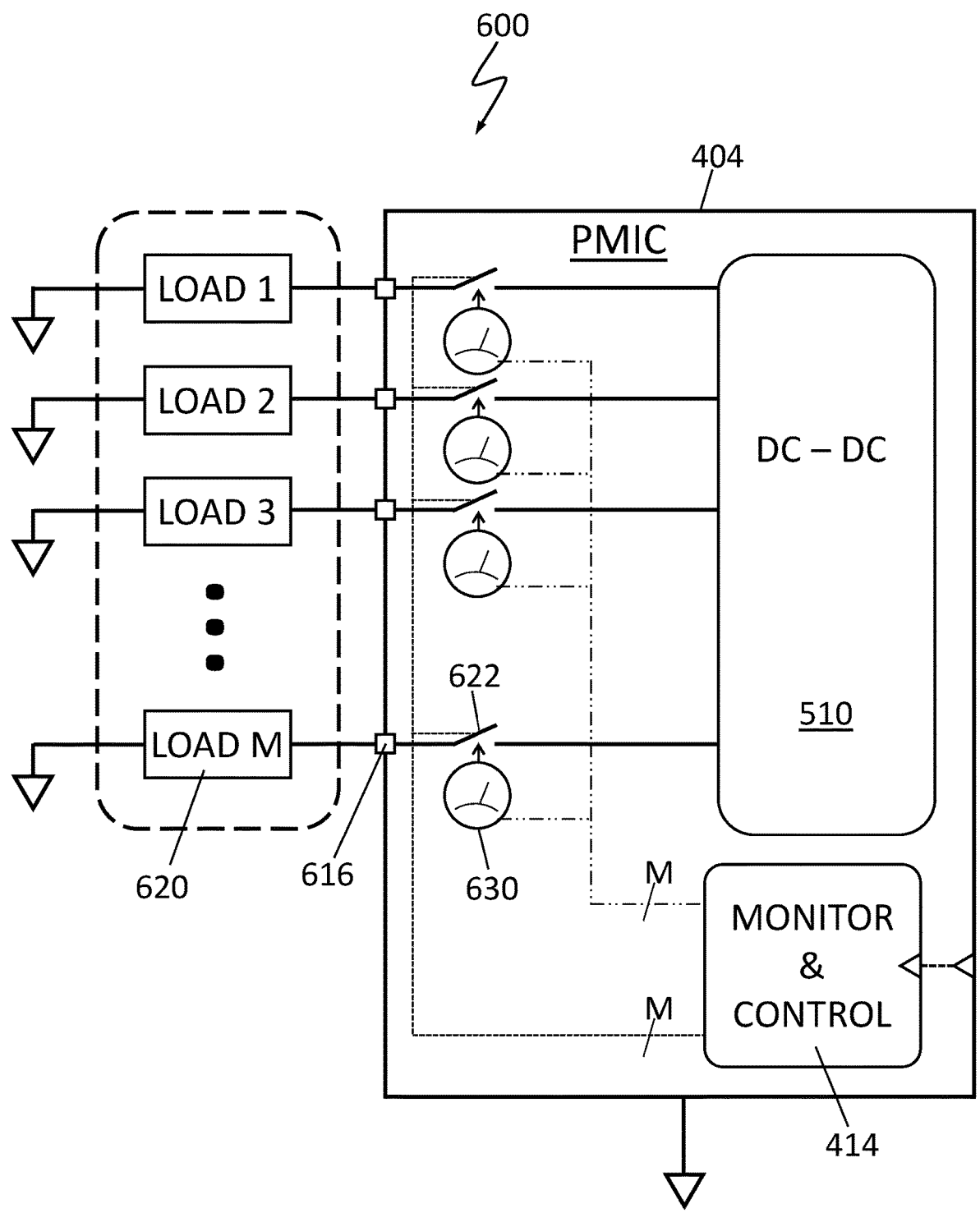
FIG. 6 illustrates details of the connection between the PMIC and various loads in a contact lens.
Figure 7:
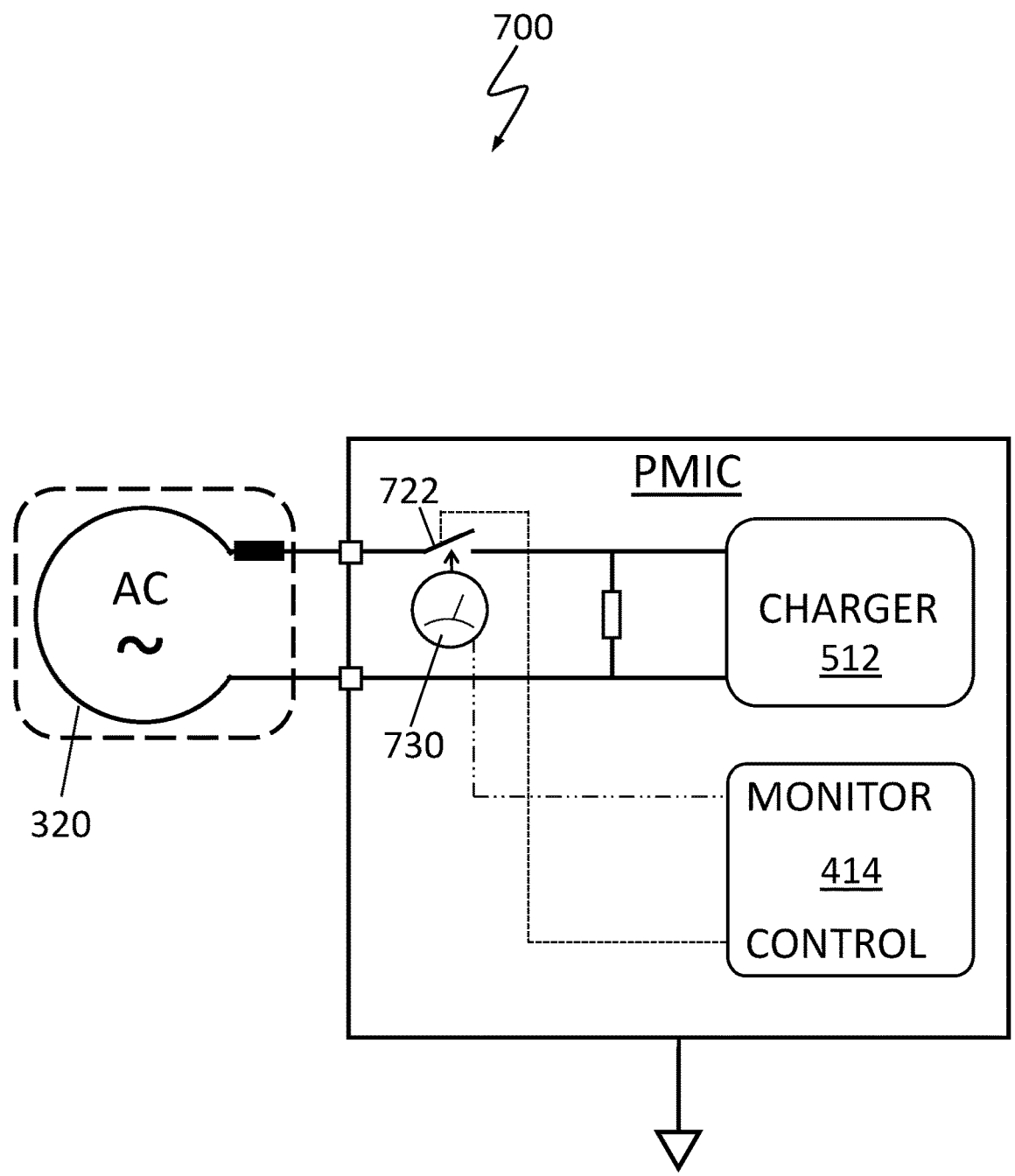
FIG. 7 illustrates details of the connection between PMIC and an external source such as a coil.

FIGS. 5, 6 and 7 illustrate details of the connections between the PMIC and the cells, load and external source, respectively. FIG. 5 illustrates details of the connection between the PMIC 404 and the cells of battery 402 such as cell 408 or cell 420. Each cell is connected to the PMIC via its own pin. For example cell 420 is connected to the PMIC via pin 516. Each pin of the PMIC has an associated switch and voltage and/or current monitor. For example, switch 422 is connected to pin 516 and monitored by voltage and/or current monitor 430. The "slash N" symbol in the lines connecting the switches and the monitors to monitor and control block 414 indicates that there are N switches and N monitors corresponding to N cell connection pins on the PMIC and N cells in the battery. The monitor and control block 414 may connect charger 512 to the battery cells to charge them or it may connect the battery cells to DC-DC converter block 510.

PMIC 404 in circuit 500 comprises DC-DC converter 510, charger 512, and monitor/control circuit 414. Cells 408 in FIG. 5 may be individually connected to PMIC 404 via pins 516. Switches 422 inside the PMIC connect or disconnect cells 408. A number, n, of pins 516 are used to connect n cells to PMIC 404 so that each cell may have its own connection to PMIC 404.

In operation, the parallel combination of cells 408 increases overall circuit efficiency and fault tolerance by effectively reducing the relatively high internal resistance of cells 408. For example, if each of the n cells in FIG. 5 has an internal resistance of 3200 Ohms, the effective internal resistance of the battery will be about 3200/n Ohms in regular operation. In other words, losses are reduced by a factor n.

DC-DC converter 510 is a block that converts voltages and currents for the outputs of PMIC 404. Switches 422 may time-share monitor/control circuit 414 that monitors current on the outputs of PMIC 404, e.g., within the context of a diagnostic procedure that sequentially measures cells 408 to obtain individual voltages and/or currents 430. Monitor/control circuit 414 may use voltage and/or current sensing circuits, comparators, and other circuits known in the art to detect and monitor overcurrent and/or overvoltage conditions.

In response to a voltage and/or current measurement that indicates a fault, such as a short circuit condition, monitor/control circuit 414 causes the faulty circuit components to be isolated. Monitor/control circuit 414 monitors the direction of the current flowing between cells 408 and PMIC 404 to identify the location of faults. Monitor/control circuit may monitor voltages and/or currents at the switches sequentially; i.e. first pin one, then pin two, etc. The time required to complete a cycle of monitoring each pin is short enough that corrective action can be taken before a fault causes appreciable heating or system malfunction.

Reverse current may be expected at some pins if there is a mismatch between cells 408. Therefore reverse current is not interpreted as a sign of a cell failure unless it exceeds a threshold level. If a faulty cell is isolated by opening its associated switch PMIC 404 may resume regular operation albeit with reduced battery capacity.

If the PMIC detects that the power drawn from the battery is much larger than the power delivered to the load, then there may be a fault within DC-DC converter 510. In this case the PMIC may disconnect the DC-DC converter or turn itself off.

PMIC 404 allows for a large $R_{INT}$ in individual cells 408, while keeping the effective internal resistance of battery 402 relatively small, thereby, reducing potential efficiency loss.

FIG. 6 illustrates details of the connection between the PMIC 404 and various loads in the contact lens. M different loads such as load 620 are shown in the figure. PMIC 404 in circuit 600 may detect faults at its outputs, for example, by monitoring power flowing through output switches 622. In response to detecting an output power that exceeds a threshold, the PMIC may open a switch to isolate a load.

The PMIC may further detect internal short circuit conditions, for example, in an internal power supply (not shown) or in monitor/control circuit 414. When monitor/control circuit 414 is not operable or not yet active, loads may be disconnected. The "slash M" symbol in the lines connecting the switches and the monitors to monitor and control block 414 indicates that there are M switches and M monitors corresponding to M load connection pins on the PMIC and the M loads. The monitor/control circuit may monitor voltages and/or currents at the switches sequentially; i.e. first pin one, then pin two, etc. The time required to complete a cycle of monitoring each pin is short enough that corrective action can be taken before a fault causes appreciable heating.

One or more components in PMIC 404 may be implemented as redundant sub-circuits. For example, two or more monitor/control circuits 414 may be utilized; additional switches may be placed in series; and groups of cells may be divided into sub-groups that each may be monitored a separate PMIC (not shown).

FIG. 7 illustrates details of the connection between PMIC 404 and an external source 320 such as a coil for receiving power inductively. The external source is connected to charger 512. In operation, switch 722 couples and decouples source 320 from charger 512 as controlled by monitor/control circuit 414.

Figure 8:
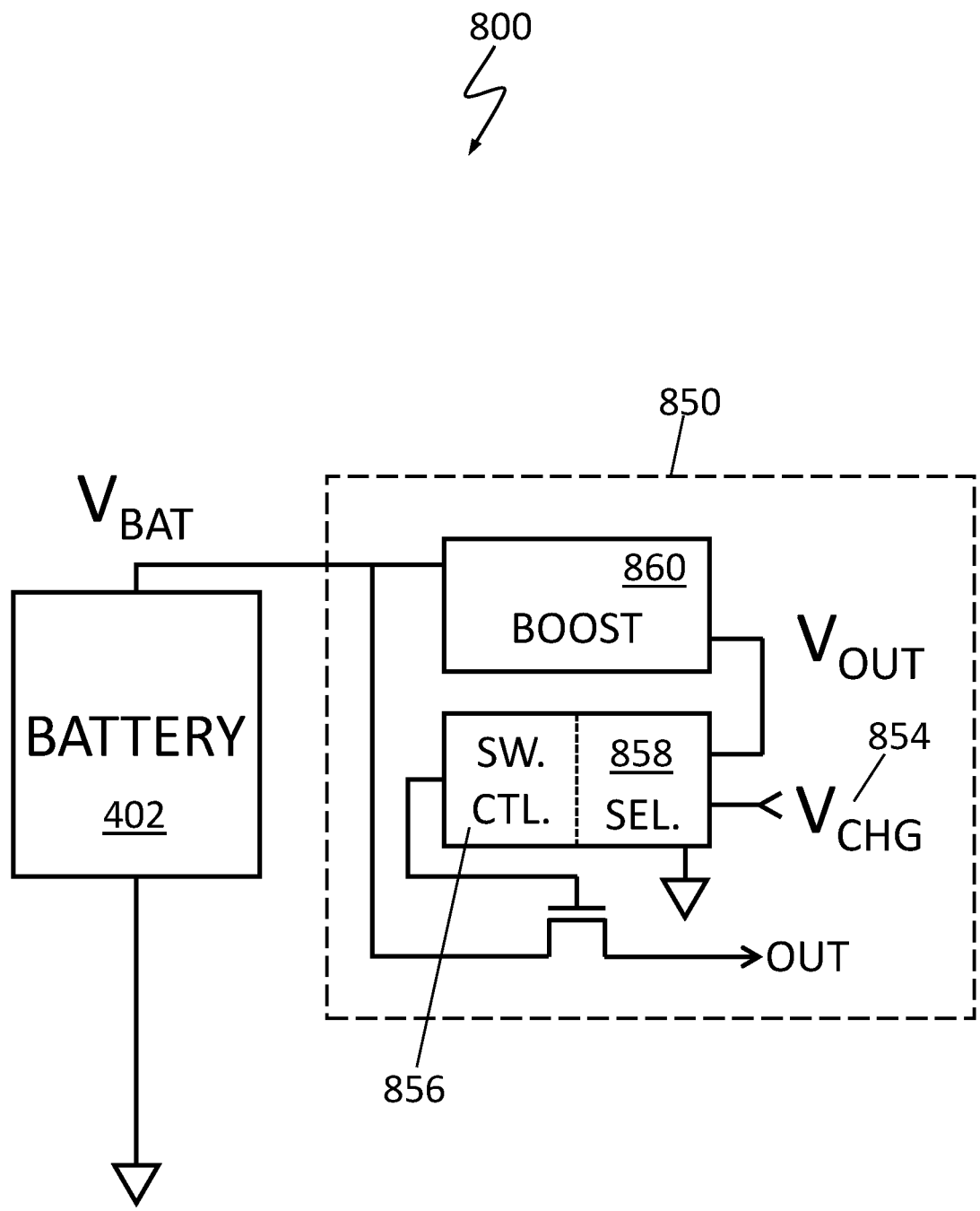
FIG. 8 is a block diagram for a startup circuit.

FIG. 8 is a block diagram for a startup circuit. Startup circuit 850 comprises battery 402, switch control circuit 856, selection circuit 858, boost converter 860, which may be implemented as a voltage booster circuit powered by battery 402, NMOS switch 804, and charger input 854.

In operation, selection circuit 858 may select the larger of charger voltage 854 and battery voltage, $V_{BAT}$, to power-up circuit 850 to ensure that a reliable source of power is available during PMIC startup. Absent circuit 850, if battery 402 is were fully depleted, there would be no initial voltage available to turn on NMOS switch 804 and the battery couldn't be charged. An alternate solution substitutes a normally-on PMOS switch for NMOS switch 804.

If the voltage of battery 402 is maintained above a minimum voltage, then that is sufficient to power circuit 850 and boost converter 860. In that case, boost converter 860 may boost $V_{BAT}$ to an output voltage (or boost voltage) $V_{OUT}$ that is higher than battery voltage by a certain boost ratio, e.g., 1.2 (i.e., 20% higher) to power NMOS switch 804. If the voltage of battery 402 drops below the minimum voltage, then startup circuit 850 may be powered from charger input 854.

The circuit in FIG. 8 consumes relatively little power. Even if the boost converter is coupled before NMOS switch 804, the switch stores relatively little energy, such that in case of a short circuit within boost converter 860 itself, no significant temperature rise would be expected.

If a fault cannot be immediately cured, the PMIC may automatically cease operating and enter a reset state to protect the contact lens until the PMIC can be rebooted by placing it in a charger. However, when the lens is in the charger, the fault may cause the PMIC to continuously trigger a reset, thereby, entering an endless loop of reboot attempts that prevents the PMIC from leaving the reset stage to properly transition to a charging state. Therefore, to eliminate these endless loops that would render the circuit inoperable, PMIC detects battery faults on startup using screening logic shown in FIG. 9.

Figure 9:
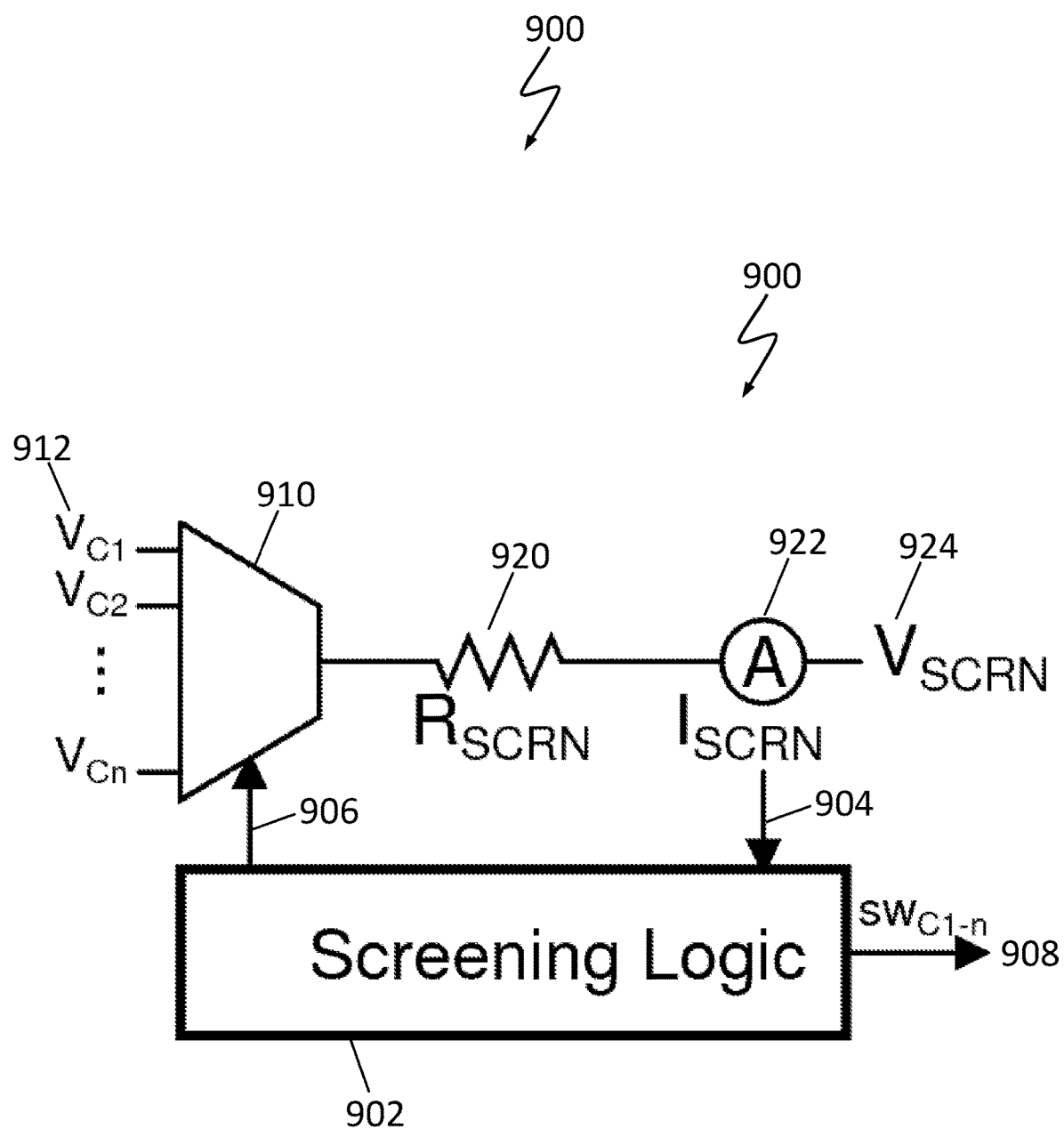
FIG. 9 is a general illustration of an exemplary fault detection circuit for detecting faults that may be internal or external to a battery.

FIG. 9 illustrates an exemplary fault detection circuit for detecting faults that may be internal or external to a battery. Circuit 900 comprises screening logic 902, multiplexer 910 that receives cell voltages $V_{C1}$-$V_{Cn}$ as inputs 912 that may be provided by individual cells of a battery, screening or sensing resistor 920, current measurement circuit 922, and screen voltage 924 that may be generated by the PMIC when it is connected to a charger.

Screening logic 902 may be used when an electronic contact lens battery is charged. Prior to charging the battery, multiplexer 910 sequentially couples to individual battery cells to receive cell voltages $V_{C1}$-$V_{Cn}$ 912 that each correspond to an output voltage of a cell or a subgroup of cells. Screening logic 902 uses multiplexer 910 to select which cell to monitor at any given time.

Circuit 900 further uses a predetermined screen voltage 924, $V_{SCRN}$, to drive a screening current, $I_{SCRN}$, through screening resistor, $R_{SCRN}$, 920 into the selected cell. The screening resistor 920 is designed to limit the current to an acceptable level that the charger can handle. Screening logic 902 uses current measurement circuit 922 to determine a screening current, e.g., by measuring magnitude and/or direction or by measuring a voltage across screening resistor 920. If the screening current associated with the cell (408) is within a threshold, e.g., based on the detected overcurrent condition, screening logic 902 may generate and output a control signal 908 to enable a connection between battery (402) and charger (512), such that in a subsequent step, e.g., during a charging cycle, only those cells (408) of battery (402) that did not exhibit a fault during screening will be coupled to charger (512). In this manner, by leaving switch (422) open to decouple a particular battery cell (420) from charger (512)/PMIC (404) during regular operation, screening logic 902 prevents overcurrent and other fault conditions from causing damage to circuit components if they were to remain coupled to a faulty battery cell (420).

Circuit 900 may be used to detect faults at various locations that are internal and external to a battery cell (420), e.g., an overcurrent condition caused by a short circuit on a section of a board that is external to both the battery and PMIC (404), e.g., between a pin (516) of the PMIC (404) and the cell (420). Circuit 900 may be used each time PMIC (404) is reset, e.g., in scenarios where PMIC (404) does not store information related to faulty cells (420).

Figure 10:
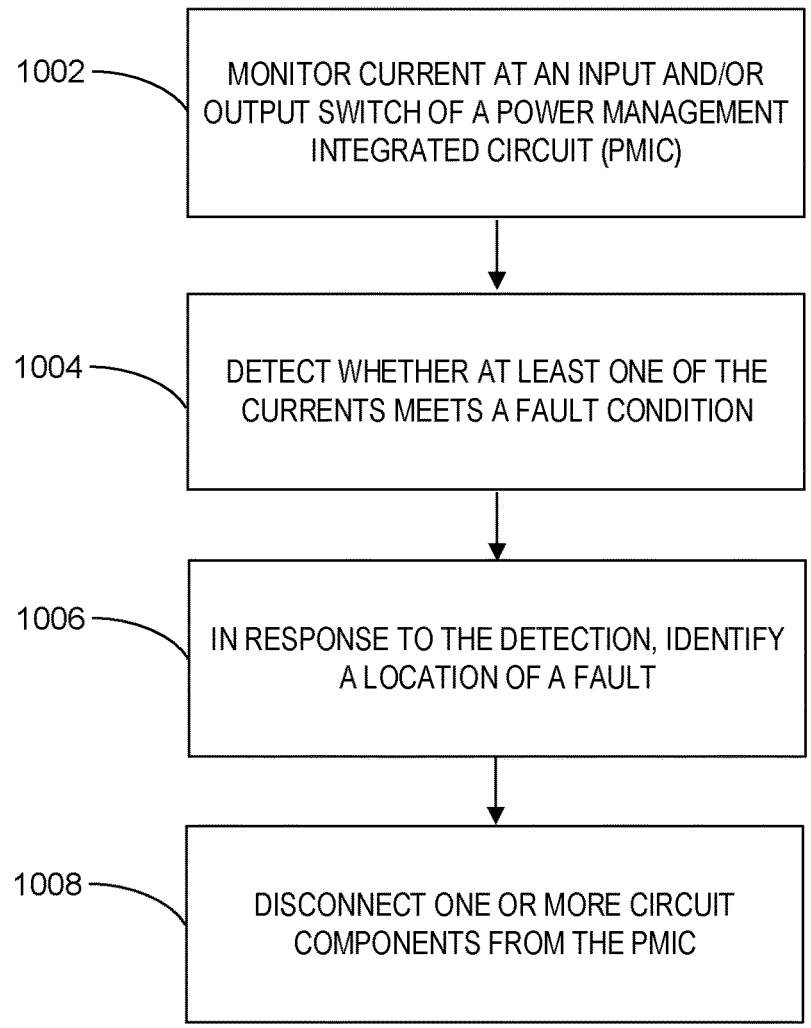
FIG. 10 is a flowchart for a process for operating a contact lens battery management system.

FIG. 10 is a flowchart for a process for operating a contact lens battery management system. Process 1000 may begin at step 1002 when current flow through an input switch and/or output switch that is coupled to a PMIC is monitored in any suitable intervals. The input switch may be coupled in series with a cell of a battery, and the output switch may be coupled in series with a load.

At step 1004, it is detected whether at least one of the currents meets a fault condition, e.g., a reverse current detected in cell connection switches exceeding a threshold for a predetermined length of time. It is understood that current may be derived from a voltage measurement that indirectly senses a current that exceeds a threshold.

At step 1006, in response to an overcurrent or overvoltage, a location of a fault, e.g., a short circuit location at the input or output of the PMIC, is identified.

At step 1008, the input switch and/or output switch is controlled to disconnect one or more circuit components, such as cells or electrical loads, from the PMIC to isolate the location of the fault.

Figure 11:
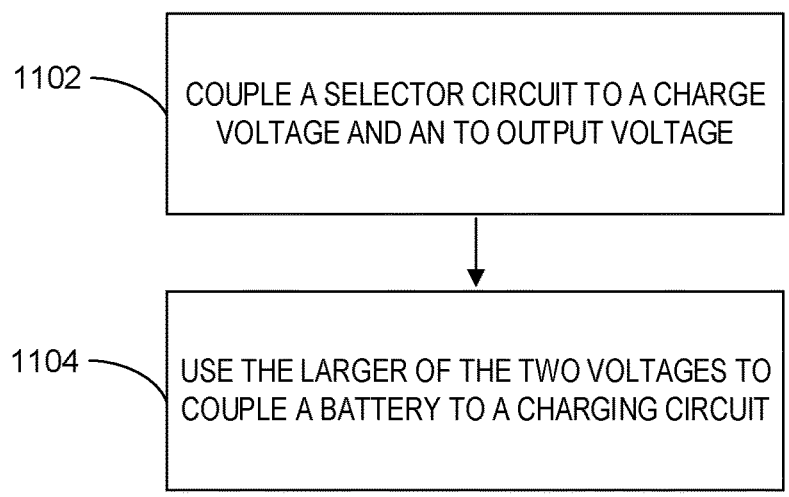
FIG. 11 is a flowchart for a process for operating a startup circuit.

FIG. 11 is a flowchart for a process for operating a startup circuit that even in the event that a battery is fully depleted, some source of power is available for an initial start-up. Process 1100 may begin at step 1102 when a selector circuit within a PMIC is coupled to a boost converter and a charger having a charge voltage. The boost converter is configured to convert a battery voltage, which typically powers the startup circuit, to an output voltage.

At step 1104, the selector circuit may be used to cause the larger of the charge voltage or the output voltage that is generated by the boost converter to operate a switch control circuit. The switch control circuit may activate one or more switches coupled to a battery. In embodiments, the switches may comprise NMOS switches that may couple the battery to a charging circuit. In this manner, even in scenarios where the battery is depleted to a degree that it cannot provide sufficient voltage to properly operate the boost converter and, thus, the switch control circuit, a source of power is still available to operate the switch control circuit and connect the battery to a charger to facilitate an initial start-up.

Figure 12:
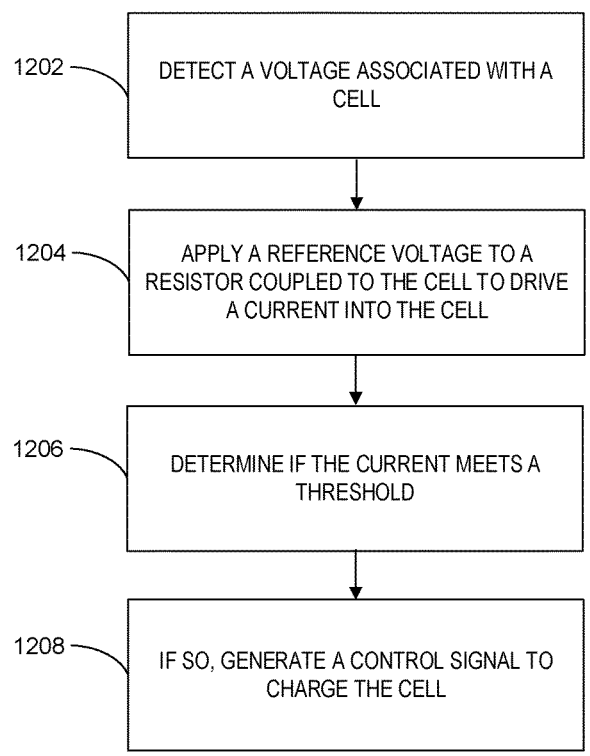
FIG. 12 is a flowchart for a process for using a fault detection circuit to detect a fault condition during a BMS boot sequence.

FIG. 12 is a flowchart for a process for using a fault detection circuit to detect a fault condition during a BMS boot sequence. Process 1200 may begin at step 1202 when a cell voltage associated with a selected battery cell, or group of cells, is detected, e.g., by using a multiplexer that is controlled to sequentially scan cells in a battery to determine their voltages.

At step 1204, a reference voltage is applied to a current limiting resistor that is coupled to the selected cell. The reference voltage drives a current into the cell.

At step 1206, the current is measured, e.g., by using a current measurement circuit, to determine whether the current meets a threshold.

If so, then at step 1208, if the current meets the threshold, a control signal is generated to charge the cell, e.g., by enabling a switch to connect the cell to a charging device. Contrariwise, if the current does not meet the threshold, the switch remains not enabled.

What is claimed is:

1. An electronic contact lens comprising:
   a plurality of battery cells that provide power to a plurality of electrical loads within the electronic contact lens;
   a power management integrated circuit (PMIC) coupled between the plurality of battery cells and the plurality of loads, the PMIC monitoring each battery cell within the plurality of battery cells;
   a first plurality of switches coupled within the PMIC, the first plurality of switches provides a discrete connection for each of the battery cells within the plurality of battery cells to the PMIC, the first plurality of switches is operable to individually isolate a first battery cell within the plurality of battery cells in response to the PMIC detecting an electrical fault associated the first battery cell; and
   a second plurality of switches coupled between the PMIC and the plurality of electrical loads, the second plurality of switches operable to isolate a first electrical load within the plurality of loads in response to detecting a first current level flowing into the first electrical load that is greater than a threshold current level.

2. The electronic contact lens of claim 1 wherein the first battery cell has an internal resistance that is greater than 0.1 times an equivalent resistance of a corresponding electrical load within the plurality of the electrical loads.

3. The electronic contact lens of claim 1 wherein the first battery cell has an internal resistance that is greater than 200 Ohms.

4. The electronic contact lens of claim 1 wherein the PMIC isolates the first battery cell from a corresponding electrical load within the plurality of electrical loads in response to detecting a first current level flowing into the first battery cell that is greater than a threshold current level.

5. The electronic contact lens of claim 1 wherein the first plurality of switches isolates the plurality of battery cells from the plurality of electrical loads in response to detecting a fault within the PMIC.

6. The electronic contact lens of claim 1 wherein the first battery cell is isolated in response to detecting an internal short within the first battery cell.

7. The electronic contact lens of claim 1 wherein the first battery cell is isolated in response to detecting an external short between the first battery cell and the PMIC.

8. The electronic contact lens of claim 7 wherein the electronic contact lens is reset in response to detecting the external short, the first battery is identified by screening logic that iteratively tests each battery cell within the plurality of battery cells.

9. The electronic contact lens of claim 1 further comprising an inductive coil that is coupled to the PMIC, the inductive coil facilitating wireless charging to at least one battery cell within the plurality of battery cells.

10. The electronic contact lens of claim 1 further comprising a power-up circuit coupled within the PMIC, the power-up circuit selects either a boost converter output voltage or a charge voltage to couple at least one battery cell, within the plurality of battery cells, to a charging circuit.

11. The electronic contact lens of claim 10 wherein the power-up circuit maintains the charge voltage above a predetermined voltage to prevent the at least one battery cell from discharging below the predetermined voltage.

12. The electronic contact lens of claim 10 further comprising a fault detection circuit coupled within the PMIC, the fault detection circuit isolates the plurality of battery cells from the charging circuit in response to detecting a screening current level into the plurality of battery cells that exceeds a threshold level, the screening current iteratively tests each battery cell within the plurality of battery cells for an electrical short across a corresponding connection to the PMIC.

13. A method for using a power management integrated circuit (PMIC) to manage a battery on an electrical contact lens, the method comprising:
   individually coupling each battery cell within a set of n battery cells to the PMIC via a set of corresponding n switches that are coupled to a set of corresponding n connection pins, wherein $n \geq 2$;
   upon sensing an overcurrent that flows to a first battery cell within the set of n battery cells, isolating the first battery cell from the PMIC by opening a first corresponding switch within the set of n switches; and
   wherein the first battery cell is isolated in response to detecting an external short between the first battery cell and the PMIC.

14. The method of claim 13 wherein each battery cell within the set of n battery cells has an internal resistance that is greater than 0.1 times an equivalent resistance of an electrical load that is coupled to the PMIC.

15. The method of claim 13 wherein each battery cell within the set of n battery cells has an internal resistance that is greater than 200 Ohms.

16. The method of claim 13 wherein the first battery cell is isolated in response to detecting an internal short within the first battery cell.

17. The method of claim 13 wherein the electronic contact lens is reset in response to detecting the external short, the first battery is identified by screening logic that iteratively tests each battery cell within the set of n battery cells.

18. An electronic contact lens comprising:
   a plurality of battery cells that provide power to a plurality of electrical loads within the contact lens;
   a power management integrated circuit (PMIC) coupled between the plurality of battery cells and the plurality of electrical loads, the PMIC monitors each battery cell within the plurality of battery cells;
   a first plurality of switches coupled within the PMIC, the first plurality of switches provide a discrete connection for each of the battery cells within the plurality of battery cells;
   a charging circuit coupled to the first plurality of switches to charge the plurality of battery cells;
   a second plurality of switches coupled between the PMIC and the plurality of electrical loads, the second plurality of switches operable to isolate a first electrical load within the plurality of loads in response to detecting a first current level flowing into the first electrical load that is greater than a threshold current level a fault detection circuit that that detects a fault within the plurality of battery cells, the fault detection circuit performing steps comprising:
  selectively coupling to each of the battery cells within the plurality of battery cells;
  applying a reference voltage to the resistor to generate a screening current that flows into at least one of the battery cells; and
  upon determining that the screening current exceeds a threshold, using at least one of the first plurality of switches to disconnect the at least one battery cell from the charging circuit.

19. The electronic contact lens of claim 18, wherein the fault detection circuit disconnects the cell from the charging circuit by generating a control signal opens at least one of the plurality of switches.

\* \* \* \* \*